United States Patent [19]
Berényi nee Poldermann et al.

[11] 3,873,542
[45] Mar. 25, 1975

[54] 3-AMINO-AS-TRIAZINO[6,5-C]QUINOLINE AND ITS 1-OXIDE, AND A PROCESS FOR THE PREPARATION THEREOF

[75] Inventors: Edit Berényi nee Poldermann; László Pallos; Lujza E. Petőcz; Peter Görög; Zoltán Budai; Enikő Kiszelly; Pál Benkó, all of Budapest, Hungary

[73] Assignee: EGYT Gyogyszervegyeszeti Gyar, Budapest, Hungary

[22] Filed: May 1, 1973

[21] Appl. No.: 356,175

[30] Foreign Application Priority Data
May 5, 1972 Hungary............................. EE 2020

[52] U.S. Cl......... 260/248 AS, 424/249, 260/287 R
[51] Int. Cl............................................ C07d 57/34
[58] Field of Search............................. 260/248 AS

[56] References Cited
UNITED STATES PATENTS
3,597,427  8/1971  Lewis et al.......................... 260/248

Primary Examiner—John M. Ford
Attorney, Agent, or Firm—Young & Thompson

[57] ABSTRACT

3-Amino-as-triazino[6,5-c]quinoline or its 1-oxide can be prepared as follows: 4-chloro-3-nitroquinoline is reacted with guanidine, the formed 4-guanidino-3-nitroquinoline is subjected to ring closure in an alkaline medium, and, if desired, the 1-oxide group of the thus-obtained 3-amino-as-triazino[6,5-c]-quinoline-1-oxide is split off under reductive conditions, the obtained 3-amino-1,2-dihydro-as-triazino[6,5-c]quinoline is oxidized into 3-amino-as-triazino[6,5-c]quinoline, and, if desired, any compound obtained by the above process is converted into its salt.

The compounds of the invention are novel and possess valuable anti-inflammatory and antimicrobial activities.

2 Claims, No Drawings

3-AMINO-AS-TRIAZINO[6,5-C]QUINOLINE AND ITS 1-OXIDE, AND A PROCESS FOR THE PREPARATION THEREOF

This invention relates to 3-amino-as-triazino-[6,5-c]quinoline and its 1-oxide.

The novel compounds of the invention possess valuable anti-inflammatory and antimicrobial activities.

3-Amino-as-triazino[6,5-c]quinoline-1-oxide can be prepared according to the invention by reacting 4-chloro-3-nitroquinoline with guanidine, and subjecting the thus-obtained 4-guanidino-3-nitroquinoline to ring closure in an alkaline medium. If desired, the 1-oxide group of the product can be split off under reductive conditions to yield 3-amino-1,2-dihydro-as-triazino[6,5-c]quinoline, which latter compound can be oxidized into 3-amino-as-triazino[6,5-c]quinoline either directly or after isolating the 1,2-dihydro compound in the form of its salt.

The compounds according to the invention are of basic character and form acid addition salts. The scope of the invention encompasses also these salts, as well as the processes for the preparation of such salts.

To prepare the compounds of the invention 1 mole of 4-chloro-3-nitroquinoline is reacted preferably in an alcoholic medium with 2 moles of guanidine, this latter reactant being liberated from an appropriate guanidine salt with sodium alcoholate in the reaction mixture itself. Using this procedure, the 4-guanidino-compound can be obtained in high yield. One may also use 4-chloro-3-nitroquinoline and the respective guanidine salt in equimolar amounts, whereupon the 4-guanidino-compound can be isolated in the form of its salt also with excellent yields. The thus-obtained 4-guanidino-compound is heated in an alkaline medium, preferably in aqueous potassium carbonate solution, to yield the cyclic compound, i.e. 3-amino-as-triazino[6,5-c]quinoline-1-oxide.

According to a preferred method 4-chloro-3-nitroquinoline is reacted with guanidine in the presence of 2 moles of sodium ethoxide calculated for the guanidine compound, at elevated temperatures. Using this method, the 3-amino-as-triazino-[6,5-c]quinoline-1-oxide can be prepared in a single step.

The 1-oxide compound can be reduced, e.g. hydrogenated in the presence of palladium catalyst, to yield 3-amino-1,2-dihydro-as-triazino[6,5-c]quinoline. This compound is isolated preferably in the form of its hydrochloride, thereafter aromatized into 3-amino-as-triazino[6,5-c]quinoline by contacting it with an oxidizing agent. The aromatization can be carried out directly after the reductive splitting of the 1-oxide group, without isolating the dihydro intermediate. In such instances the catalyst is filtered off, the filtrate is evaporated, and the crystalline residue is oxidized.

The compounds of the invention have low toxicity values and possess significant anti-inflammatory and antimicrobial activities.

The toxicity values of the compounds have been examined on mice. The compounds were administered orally and intraperitoneally, in a suspension formed with Tween 80 suspending agent. The results are summarized in Table 1.

Table 1

| Compound | $LD_{50}$ mg./kg. i.p. | p.o. |
| --- | --- | --- |
| 3-amino-as-triazino-[6,5-c] quinoline-1-oxide | above 3000 | 3200 |
| 3-amino-as-triazino-[6,5-c] quinoline | 175 | 2200 |

The anti-inflammatory activity of the new compounds was investigated on rats by the carrageenin-oedema test, using the method of Winter et al. (J. Pharmacol. Exp. Ther. 141, 369 /1963/). Male rats weighing 150 to 180 g. were used as test animals. 0.1 ml. doses of 1 % carrageenin-suspension were injected subcutaneously into the hind paws of the animals, and the thus-provoked oedema was measured by plethysmometer. The compounds to be tested were administered orally in the doses as indicated in Table 2. The percentage inhibition was calculated by comparing the measures of oedema of the tested animals to that of the controls.

The results of the above test are summarized in Table 2.

Table 2

| Compound | Dosis mg./kg. | Inhibition % |
| --- | --- | --- |
| 3-amino-as-triazino[6,5-c]-quinoline-1-oxide | 150 | 19.6 |
| 3-amino-as-triazino[6,5-c]-quinoline | 25 | 28.4 |
|  | 50 | 28.6 |
|  | 100 | 41.9 |
|  | 300 | 45.3 |
| Phenylbutazon | 30 | 33 |
|  | 90 | 45 |
| Aspyrin | 180 | 39 |

The compounds of the invention can be transformed to pharmaceutical products by admixing them with carriers and/or auxiliary agents usable in the pharmaceutical industry. The pharmaceutical preparations may contain other biologically active and/or synergistic agents besides the compounds of the invention.

The invention is elucidated in detail by the aid of the following non-limiting Examples. 4-chloro-3-nitroquinoline, used as starting substance, has been prepared as described in J. Chem. Soc. (C), 1969, 1758.

EXAMPLE 1

4-guanidino-3-nitroquinoline 6.9 g. (0.3 mol.) of metallic sodium are added to 300 ml. of ethanol, and the thus-obtained ethanolic sodium ethoxide solution is added with 28.65 g. (0.3 mol.) of guanidine hydrochloride. The reaction miixture is boiled for 0.5 hours, the separated sodium chloride is removed by filtration, thereafter 31.3 g. (0.15 mol.) of 4-chloro-3-nitroquinoline are added to the stirred alcoholic guanidine solution at 30° to 50°C. Dark red solution is obtained, and the separation of crystalline 4-guanidino-3-nitroquinoline immediately sets in. 33.0 g. (95 %) of the aimed product are isolated; m.p.: 215°–216°C.

EXAMPLE 2

4-Guanidino-3-nitroquinoline hydrochloride 20.8 g. (0.1 mol.) of 4-chloro-3-nitroquinoline are added to the alcoholic solution of 0.1 mol. of guanidine prepared as described in Example 1. 21.4 g. (80 %) of yellow, crystalline 4-guanidino-3-nitroquinoline hydrochloride are obtained; m.p.: 274°–275°C.

EXAMPLE 3

3-Amino-as-triazino[6,5-c]quinoline-1-oxide

A mixture of 23.1 g. (0.1 mol.) of 4-guanidino-3-nitroquinoline, 69.5 g. (0.5 mol.) of potassium carbonate and 500 ml. of water is boiled for 5 hours. During this time the orange crystals convert to a yellow, crystalline product. 20.0 g. (94 %) of 3-amino-as-triazino[6,5-c]quinoline-1-oxide are obtained; m.p.: 302°–304°C.

EXAMPLE 4

3-Amino-as-triazino[6,5-c]quinoline-1-oxide 11.5 g. (0.5 g.-atom) of metallic sodium are dissolved in 500 ml. of ethanol, and 23.8 g. (0.25 mol.) of guanidine hydrochloride are added to the solution. The reaction mixture is boiled for 0.5 hours. The separated sodium chloride is removed by filtration, and 26.0 g. (0.125 mol.) of 4-chloro-3-nitroquinoline are added to the filtrate. The reaction mixture is boiled for 2 hours, thereafter it is cooled and filtered. 21.5 g. (81 %) of 3-amino-as-triazino[6,5-c]quinoline-1-oxide are obtained. The product is identical to that obtained according to Example 3.

EXAMPLE 5

3-Amino-as-triazino[6,5-c]quinoline 11.65 g. (0.05 mol.) of 3-amino-as-triazino[6,5-c]quinoline-1-oxide are hydrogenated in ethanol in the presence of palladium catalyst. When the hydrogen uptake ceases the solution is evaporated, and the yellow, crystalline residue is added to a 0°C solution of 33 g. (0.1 mol.) of potassium hexacyano ferrate in 500 ml. of water, the pH of which has been adjusted previously to 9 with concentrated ammonium hydroxide. The mixture is stirred for 2 hours at 0°C. 7.4 g. (75 %) of yellow, crystalline 3-amino-as-triazino[6,5-c]quinoline are obtained; m.p.: 290°–291°C.

EXAMPLE 6

3-Amino-1,2-dihydro-as-triazino[6,5-c]quinoline hydrochloride 10.65 g. (0.05 mol.) of 3-amino-as-triazino[6,5-c]quinoline-1-oxide are hydrogenated in ethanol in the presence of palladium catalyst. When the hydrogen uptake ceases, the mixture is filtered into 200 ml. of ethanolic hydrochloric acid, and the obtained solution is evaporated. 9.4 g. (80 %) of 3-amino-1,2-dihydro-as-triazino[6,5-c]quinoline hydrochloride are obtained; m.p.: 262°–264°C.

EXAMPLE 7

3-Amino-as-triazino[6,5-c]quinoline

The pH of a solution of 6.6 g. (0.02 mol.) of potassium hexacyano ferrate in 100 ml. of water is adjusted to 9 with ammonium hydroxide, and 2.35 g. (0.01 mol.) of 3-amino-1,2-dihydro-as-triazino[6,5-c]quinoline hydrochloride are added to the 0°C solution. The mixture is stirred for 1 hour at 0°C. In such way 1.85 g. (94 %) of 3-amino-as-triazino[6,5-c]quinoline are obtained. The product is identical to that obtained according to Example 5.

What we claim is:
1. 3-Amino-as-triazino[6,5-c]quinoline or its salts.
2. 3-Amino-as-triazino[6,5-c]quinoline-1-oxide or its salts.

* * * * *